US012566265B2

(12) United States Patent (10) Patent No.: US 12,566,265 B2
Hayashi (45) Date of Patent: Mar. 3, 2026

(54) DISTANCE MEASUREMENT DEVICE

(71) Applicant: DENSO CORPORATION, Kariya (JP)

(72) Inventor: Koki Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 1119 days.

(21) Appl. No.: 17/643,579

(22) Filed: Dec. 9, 2021

(65) Prior Publication Data

US 2022/0099833 A1 Mar. 31, 2022

Related U.S. Application Data

(63) Continuation of application No. PCT/JP2020/022905, filed on Jun. 10, 2020.

(30) Foreign Application Priority Data

Jun. 11, 2019 (JP) ................................. 2019-108652

(51) Int. Cl.
| | |
|---|---|
| *G01S 17/08* | (2006.01) |
| *G01S 7/481* | (2006.01) |
| *G01S 17/931* | (2020.01) |
| *G02B 26/10* | (2006.01) |

(52) U.S. Cl.
CPC ............. *G01S 17/08* (2013.01); *G01S 7/4813* (2013.01); *G01S 7/4814* (2013.01); *G01S 7/4817* (2013.01); *G01S 17/931* (2020.01); *G02B 26/105* (2013.01)

(58) Field of Classification Search
CPC ...... G01S 17/08; G01S 7/4817; G01S 17/931; G01S 7/4814; G01S 7/4813; G01S 7/4816; G01S 17/42; G01S 17/48; G02B 26/105; G02B 27/0018
USPC ......................................................... 356/4.01
See application file for complete search history.

(56) References Cited

U.S. PATENT DOCUMENTS

| | | | | |
|---|---|---|---|---|
| 6,927,002 | B2 * | 8/2005 | Hattori ...................... | G03F 1/32 430/5 |
| 2017/0350966 | A1 | 12/2017 | Hartmann et al. | |
| 2018/0211989 | A1 | 7/2018 | Hogyoku et al. | |

FOREIGN PATENT DOCUMENTS

| | | |
|---|---|---|
| JP | 4-056819 A | 2/1992 |
| JP | 11-264952 A | 9/1999 |
| JP | 2013-068582 A | 4/2013 |

(Continued)

*Primary Examiner* — Daniel L Murphy
(74) *Attorney, Agent, or Firm* — Maschoff Brennan

(57) ABSTRACT

A mirror module includes a pair of deflecting mirrors which deflect a transmission wave and a reflected wave in a direction in accordance with a rotation angle of a reflecting surface and rotates in accordance with drive of a motor. A dividing plate divides the pair of deflecting mirrors into two portions of a transmission deflecting portion and a reception deflecting portion. Each of the pair of deflecting mirrors includes shielding portions through which passage of the transmission waves is suppressed on at least one of a side surface closer to a transmissive window in a state where the reflecting surface faces the transmitting portion out of both side surfaces located across a rotational axis at the transmission reflecting portion or a side surface farther from the transmissive window in a state where the reflecting surface faces the receiving portion out of both side surfaces located across the rotational axis at the reception deflecting portion.

4 Claims, 7 Drawing Sheets

(56)     References Cited

FOREIGN PATENT DOCUMENTS

JP          2015-210098  A      11/2015

* cited by examiner

DISTANCE MEASUREMENT DEVICE

CROSS-REFERENCE TO RELATED APPLICATION

This application is the U.S. bypass application of International Application No. PCT/JP2020/022905 filed on Jun. 10, 2020, which designated the U.S. and claims priority to Japanese Patent Application No. 2019-108652, filed on Jun. 11, 2019, the contents of both of which are incorporated herein by reference.

TECHNICAL FIELD

The present disclosure relates to a distance measurement device including a deflecting mirror.

BACKGROUND

There is a distance measurement device which radiates a transmission wave, detects a reflected wave of the radiated transmission wave from an object and detects a distance to the object. The distance measurement device has a casing, and at a portion of the casing, through which a transmission wave emitted from inside to outside of the casing and a reflected wave entering from outside to inside of the casing are allowed to pass, a transmissive window through which the transmission wave and the reflected wave pass is provided.

Further, a deflecting mirror which is rotationally driven is used at the distance measurement device to perform deflection scanning for a transmission wave, and a transmission wave output from a transmitting portion is reflected at the deflecting mirror and emitted in a direction in accordance with a rotation angle of the deflecting mirror via the transmissive window. The reflected wave of the transmission wave from an object passes through the transmissive window, is reflected at the deflecting mirror and detected at a receiving portion.

SUMMARY

One aspect of the present disclosure is a distance measurement device including a transmitting portion, a receiving portion, a mirror module, dividing plates, a casing, and a transmissive window. The transmitting portion is configured to output a transmission wave. The receiving portion is configured to detect a reflected wave from an object irradiated with the transmission wave. The mirror module includes a pair of deflecting mirrors which deflect the transmission wave and the reflected wave in a direction in accordance with a rotation angle of a reflecting surface and a mirror support which supports the pair of deflecting mirrors by being disposed between the pair of deflecting mirrors and is configured to rotate in accordance with drive of a motor. The dividing plates, which are plate-like members provided to divide the pair of deflecting mirrors into two portions of a transmission deflecting portion which is a portion located on the transmitting portion side and a reception deflecting portion which is a portion located on the receiving portion side, is configured to rotate integrally with the mirror module. The casing stores the transmitting portion, the receiving portion, the mirror module, and the dividing plates. The transmissive window is provided at an opening of the casing and allows the transmission wave and the reflected wave to pass through. Each of the pair of deflecting mirrors includes shielding portions through which passage of the transmission waves is suppressed, on at least one of a side surface closer to the transmissive window in a state where a reflecting surface faces the transmitting portion out of both side surfaces located across a rotational axis at the transmission deflecting portion, or a side surface farther from the transmissive window in a state where a reflecting surface faces the receiving portion out of both side surfaces located across the rotational axis at the reception deflecting portion.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
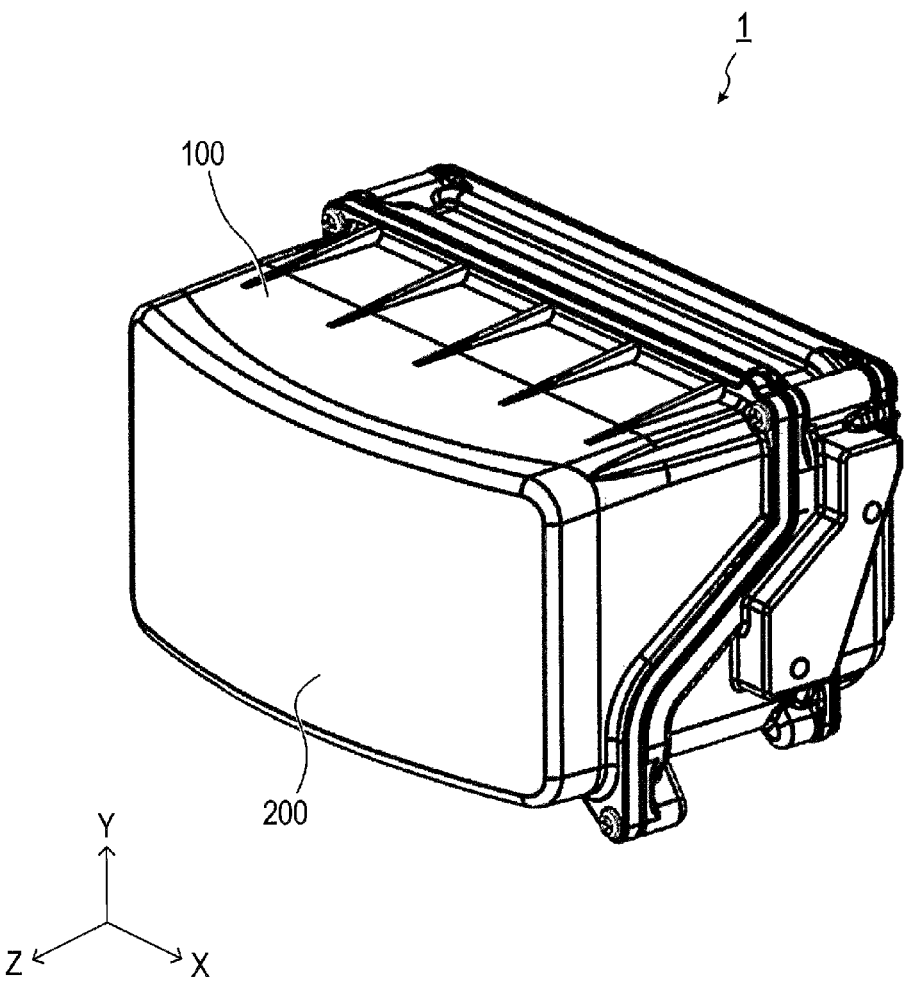
FIG. 1 is a perspective view illustrating appearance of a lidar device.

JP 2018-500603 T discloses a technique of separating a deflecting mirror into a region on a transmitting portion side and a region on a receiving portion side at a lidar device which performs deflection scanning for light. At the lidar device, a transmission beam and a reflected beam are deflected using the same deflecting mirror, and thus, a separation wall is provided on a reflecting surface of the deflecting mirror to prevent an optical short-circuit between the transmitting portion side and the receiving portion side.

However, the inventor has found the following problems as a result of detailed consideration.

There is a case where when a transmission wave reflected at a deflecting mirror passes through a transmissive window, part of the transmission wave becomes a return light by being reflected at the transmissive window and returns to the deflecting mirror without being emitted to outside of the casing.

While the deflecting mirror has, for example, a configuration where a member which allows a transmission wave and a reflected wave to pass through is used as a base and a film which reflects a transmission wave and a reflected wave is provided at a reflecting surface, there can be a configuration where the film is not provided on a side surface. In a case of such a configuration, in a case where a return light is incident on the side surface of the deflecting mirror, the return light enters inside of the deflecting mirror from the side surface.

In a case where a transmission wave and a reflected wave are deflected using the same deflecting mirror as in JP 2018-500603 T, there is a possibility that a return light may enter inside from the side surface at a portion on a transmitting portion side of the deflecting mirror that is detected at a receiving portion. In other words, there is a case where the return light is detected at the receiving portion by passing along the inside of the deflecting mirror and being output from the side surface at a portion on the receiving portion side. In this manner, even if the deflecting mirror is separated into a portion on the transmitting portion side and a portion on the receiving portion side by a separation wall, there is a case where a ghost which is an object which is detected although the object does not actually exist may occur due to a return light incident from the side surface of the deflecting mirror.

One aspect of the present disclosure is directed to reducing occurrence of ghosts due to a return light.

One aspect of the present disclosure is a distance measurement device including a transmitting portion, a receiving portion, a mirror module, dividing plates, a casing, and a transmissive window. The transmitting portion is configured to output a transmission wave. The receiving portion is configured to detect a reflected wave from an object irradiated with the transmission wave. The mirror module includes a pair of deflecting mirrors which deflect the transmission wave and the reflected wave in a direction in accordance with a rotation angle of a reflecting surface and a mirror support which supports the pair of deflecting mirrors by being disposed between the pair of deflecting mirrors and is configured to rotate in accordance with drive of a motor. The dividing plates, which are plate-like members provided to divide the pair of deflecting mirrors into two portions of a transmission deflecting portion which is a portion located on the transmitting portion side and a reception deflecting portion which is a portion located on the receiving portion side, is configured to rotate integrally with the mirror module. The casing stores the transmitting portion, the receiving portion, the mirror module, and the dividing plates. The transmissive window is provided at an opening of the casing and allows the transmission wave and the reflected wave to pass through. Each of the pair of deflecting mirrors includes shielding portions through which passage of the transmission waves is suppressed, on at least one of a side surface closer to the transmissive window in a state where a reflecting surface faces the transmitting portion out of both side surfaces located across a rotational axis at the transmission deflecting portion, or a side surface farther from the transmissive window in a state where a reflecting surface faces the receiving portion out of both side surfaces located across the rotational axis at the reception deflecting portion.

According to such a configuration, it is possible to reduce occurrence of ghost due to a return light.

An exemplary embodiment of the present disclosure will be described below with reference to the drawings.

1. CONFIGURATION

A lidar device 1 illustrated in FIG. 1 is a distance measurement device which measures a distance to an object by emitting light and receiving reflected light of the light. The lidar device 1 is used by being mounted on a vehicle and is used to detect various objects existing in front of the vehicle. The lidar is also expressed as LIDAR. LIDAR is an abbreviation for Light Detection and Ranging.

As illustrated in FIG. 1, the lidar device 1 includes a casing 100 and an optical window 200. The casing 100 is a resin box formed in a rectangular parallelepiped shape having one open surface.

Hereinafter, a direction along a longer direction of a substantially rectangular opening of the casing 100 will be referred to as an X axis direction, a direction along a shorter direction of the opening will be referred to as a Y axis direction, and a direction which is orthogonal to an X-Y plane will be referred to as a Z axis direction. Note that right and left in the X axis direction and up and down in the Y axis direction will be defined by the lidar device 1 being viewed from the opening side of the casing 100 in a state where the lidar device 1 is provided at a vehicle so that the X-Z plane becomes horizontal. Further, concerning front and back in the Z axis direction, the opening side of the casing 100 will be defined as the front, and a depth side will be defined as the back.

Figure 2:
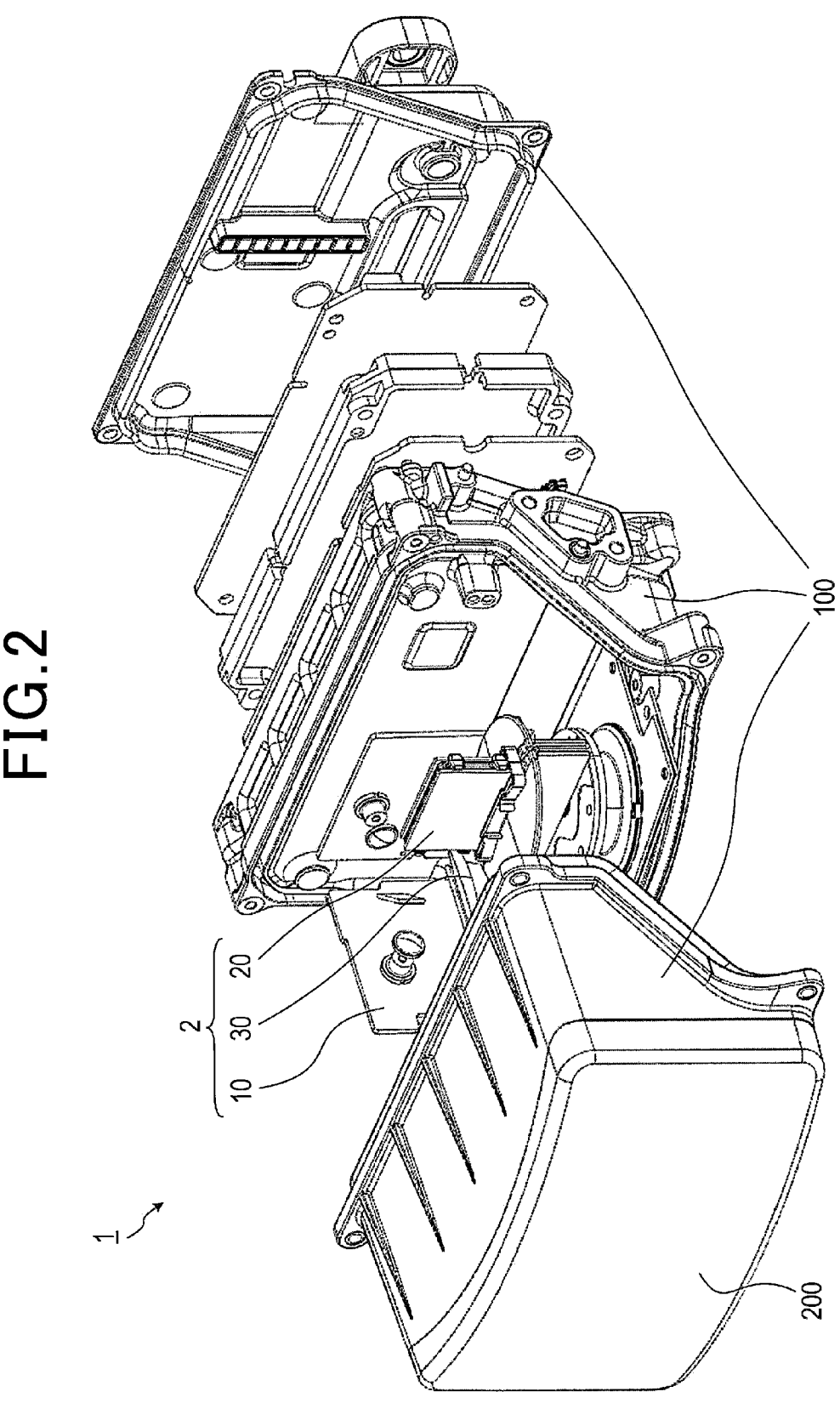
FIG. 2 is an exploded perspective view of the lidar device.

As illustrated in FIG. 2, an optical detection module 2 is stored inside the casing 100. The optical detection module 2 includes a projecting portion 10, a scanning portion 20 and a light receiving portion 30.

A configuration of the optical detection module 2 will be described in detail below.

2. SCANNING PORTION

Figure 3:
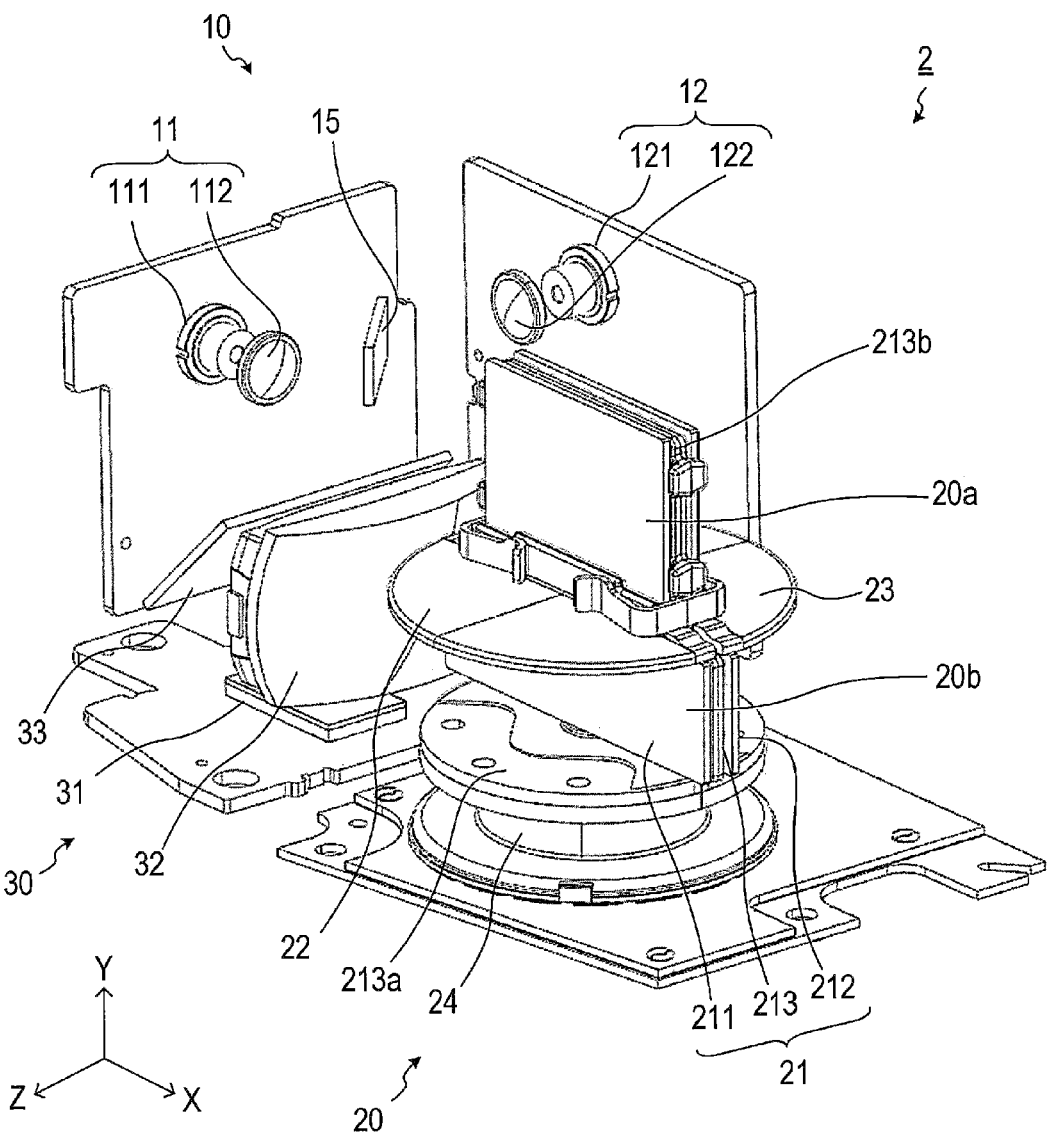
FIG. 3 is a perspective view illustrating a configuration of an optical detection module to be stored in a casing of the lidar device.

As illustrated in FIG. 3, the scanning portion 20 includes a mirror module 21, a pair of dividing plates 22 and 23, and a motor 24. The mirror module 21 is provided to stand on the motor 24, and the mirror module 21 and the pair of dividing plates 22 and 23 fixed at the mirror module 21 rotate around a rotational axis indicated by a dashed-dotted line in FIG. 4 and FIG. 5 in accordance with drive of the motor 24.

The mirror module 21 includes a pair of deflecting mirrors 211 and 212 and a mirror support 213.

The pair of deflecting mirrors 211 and 212 are both plate-like members having reflecting surfaces which reflect light.

The mirror support 213 includes a disk portion 213a and an installation portion 213b. The disk portion 213a is a circular plate-like portion, and a center of the circle is fixed at the rotational axis of the motor 24. The installation portion 213b is a plate-like portion, on both sides of which the pair of deflecting mirrors 211 and 212 are provided, and is provided to stand on a circular surface of the disk portion 213a. A shape of surfaces where the pair of deflecting mirrors 211 and 212 are provided at the installation portion 213b corresponds to a shape of the pair of deflecting mirrors 211 and 212.

Note that the pair of deflecting mirrors 211 and 212 have a shape in which two rectangles having different widths in a longer direction are integrated. Specifically, the pair of deflecting mirrors 211 and 212 have a shape in which a first rectangle and a second rectangle having a longer width in the longer direction than a width of the first rectangle are aligned and integrated along a central axis which is along shorter directions of the respective rectangles. Hereinafter, a portion corresponding to the first rectangle will be referred to as a narrow portion, and a portion corresponding to the second rectangle will be referred to as a wide portion at the pair of deflecting mirrors 211 and 212.

The pair of deflecting mirrors 211 and 212 integrated via the installation portion 213b are provided to stand on the disk portion 213a so that the wide portion is placed on the bottom and so that a position of the central axis matches a center of the circle of the disk portion 213a in a state where the pair of deflecting mirrors 211 and 212 are integrated. By this means, the mirror module 21 rotates around the rotational axis of the motor 24.

The pair of dividing plates 22 and 23 are obtained by dividing a circular plate-like member having a diameter which is the same as a width in the longer direction of the wide portion of the pair of deflecting mirrors 211 and 212 into two semicircular portions. The pair of dividing plates 22 and 23 are fixed at the mirror module 21 in a state where the narrow portion of the pair of deflecting mirrors 211 and 212 are put between the pair of dividing plates 22 and 23 from both sides, and in a state where the pair of dividing plates 22 and 23 abut on a stepped portion between the wide portion and the narrow portion of the pair of deflecting mirrors 211 and 212.

Hereinafter, a portion on an upper side of the pair of dividing plates 22 and 23 among the pair of deflecting mirrors 211 and 212, that is, a portion on the narrow portion side will be referred to as a projected light deflecting portion 20a, and a portion on a lower side of the pair of dividing plates 22 and 23, that is, a portion on the wide portion side will be referred to as a received light deflecting portion 20b.

3. DEFLECTING MIRROR

The deflecting mirrors 211 and 212 are obtained by forming a reflective film by evaporating a substance which reflects light on a reflecting surface using a mirror substrate constituted with a member which allows light to pass through as a base. While light is reflected at the reflecting surfaces of the deflecting mirrors 211 and 212 having the reflective film, light passes through side surfaces which do not have a reflective film.

[3-1. Shielding Portion]

Figure 4:
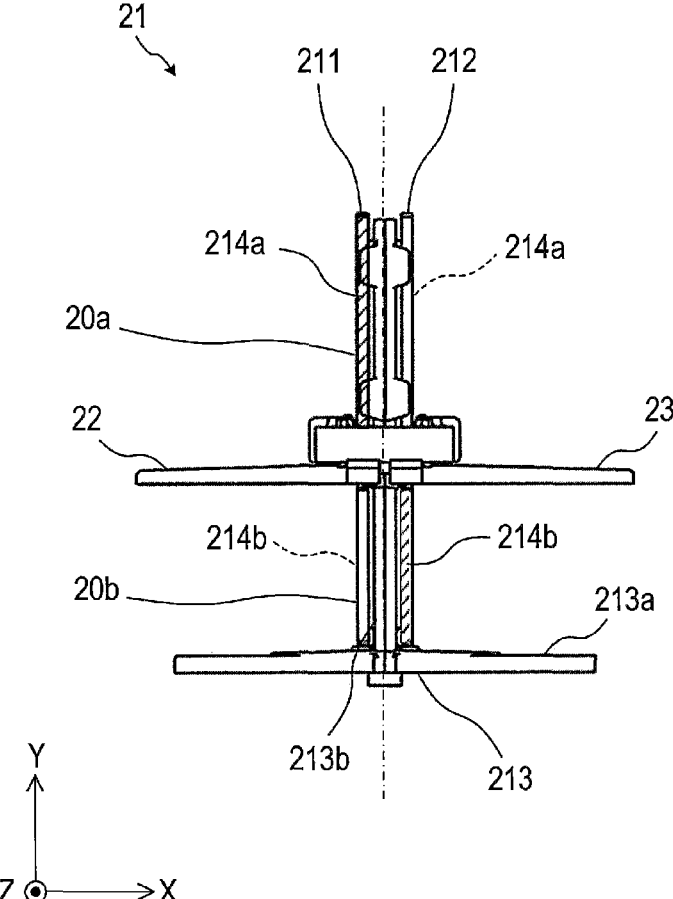
FIG. 4 is a view of a mirror module viewed from a side surface.

As indicated by shaded portions in FIG. 4, shielding portions 214a and 214b which are portions through which light is less likely to pass are formed on side surfaces of part of the deflecting mirrors 211 and 212. The shielding portions 214a and 214b are constituted by, for example, black ink being printed on a surface of the mirror substrate.

Figure 6:
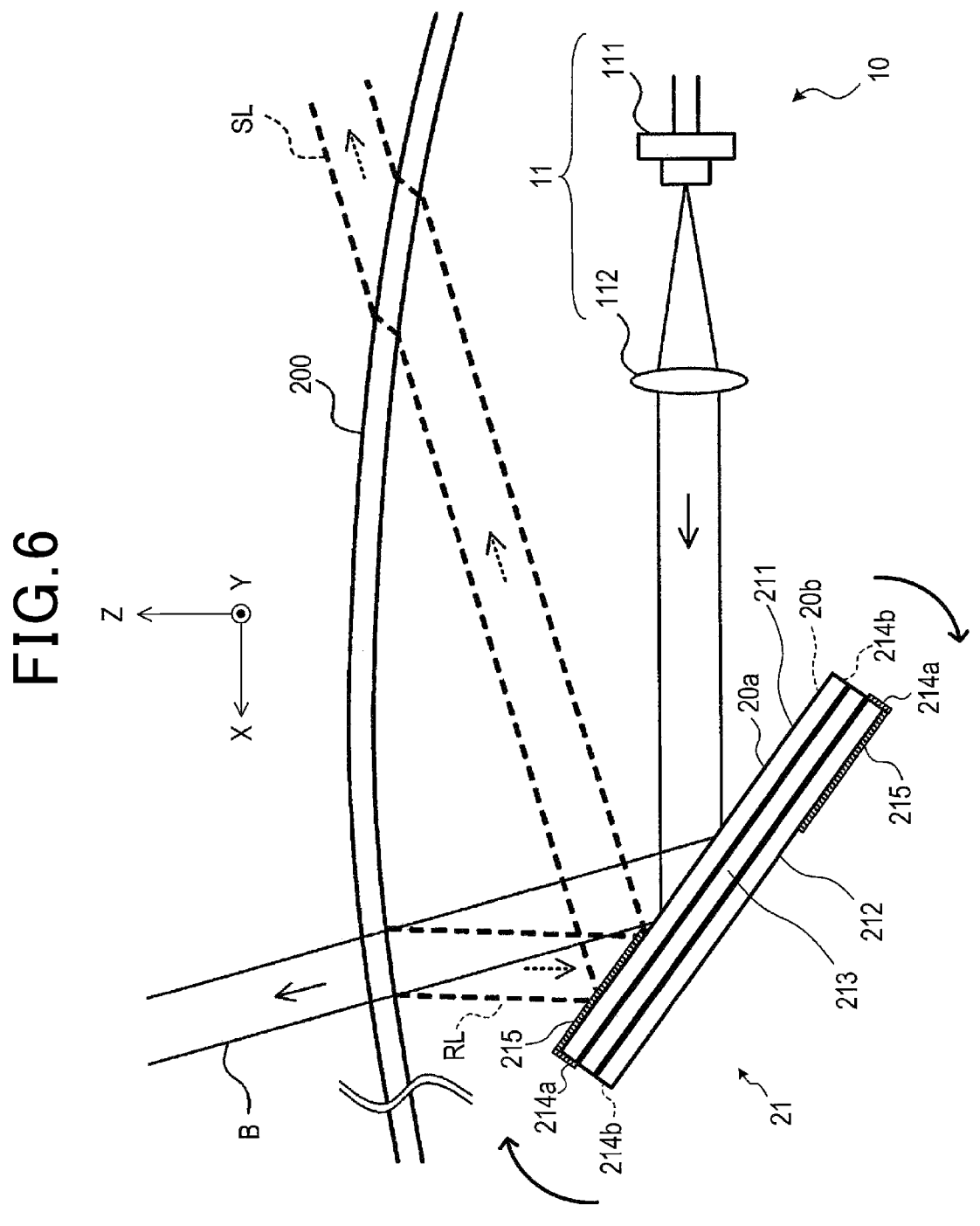
FIG. 6 is a schematic diagram illustrating an optical path in a case where a return light is incident on a reflecting surface of a projected light deflecting portion.
Figure 7:
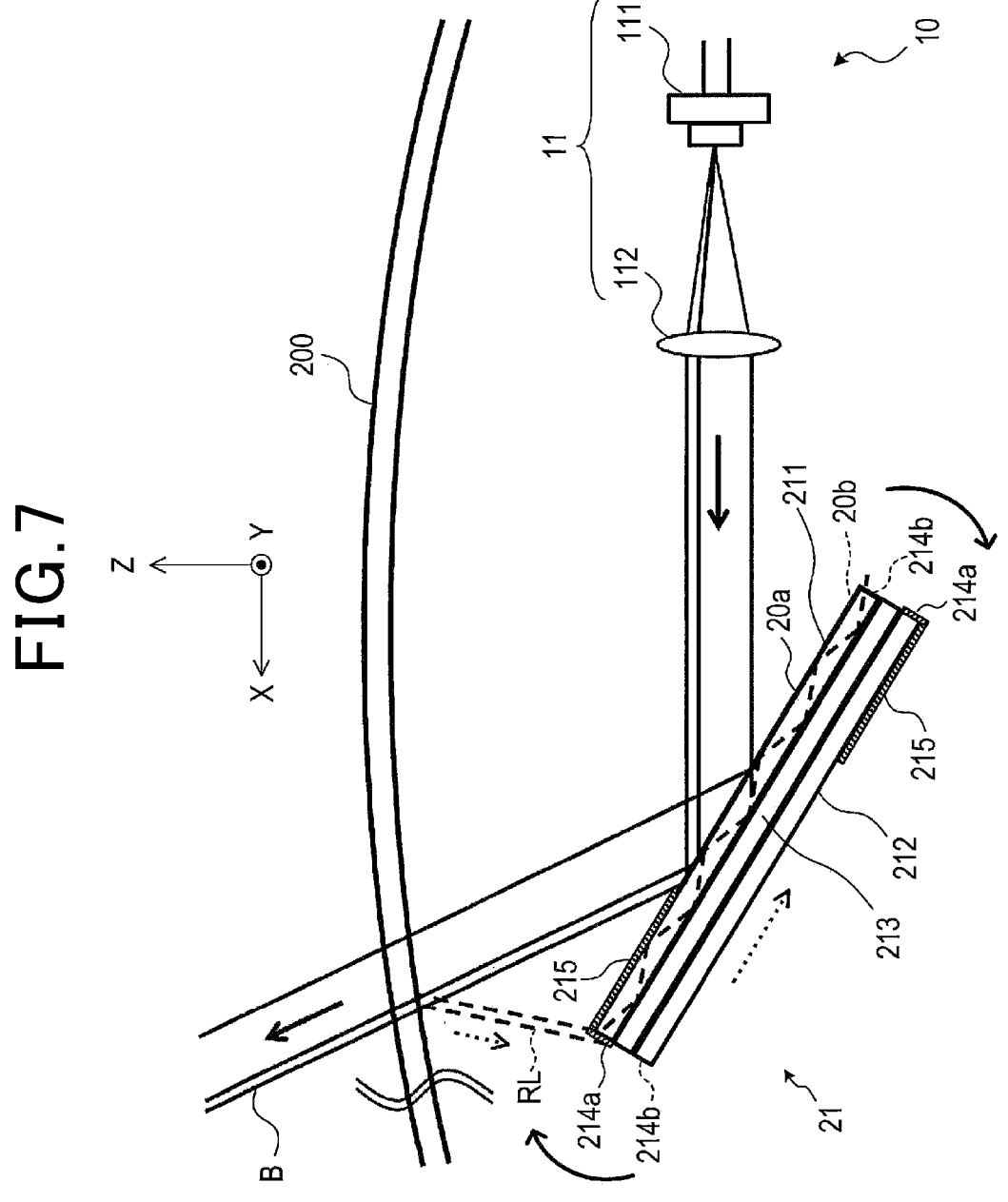
FIG. 7 is a schematic diagram illustrating an optical path in a case where a return light is incident on a side surface of the projected light deflecting portion.

Positions where the shielding portions 214a and 214b are formed will be described using FIG. 6 and FIG. 7. FIG. 6 and FIG. 7 are schematic diagrams of space in which the optical detection module 2 is stored inside the casing 100, viewed from above in the Y axis direction. Note that FIG. 6 and FIG. 7 illustrate the projecting portion 10 and the projected light deflecting portion 20a located in upper space in the Y axis direction in the space and do not illustrate the light receiving portion 30 and the received light deflecting portion 20b located in lower space. In FIG. 6 and FIG. 7, the reflecting surface of the deflecting mirror 211 faces in a direction in which the projecting portion 10 and the light receiving portion 30 are located.

The shielding portion 214a is formed on a side surface closer to the optical window 200 at each of the deflecting mirrors 211 and 212 in a state where the reflecting surface faces the projecting portion 10 out of both side surfaces located across the rotational axis at the projected light deflecting portion 20a. In FIG. 6 and FIG. 7, the shielding portion 214a at each of the deflecting mirrors 211 and 212 is indicated by a shaded portion on the side surface of the projected light deflecting portion 20a.

The shielding portion 214b is formed on a side surface farther from the optical window 200 at each of the deflecting mirrors 211 and 212 in a state where the reflecting surface faces the light receiving portion 30 out of both side surfaces located across the rotational axis at the received light deflecting portion 20b. While not illustrated in FIG. 6 and FIG. 7, the shielding portion 214b at each of the deflecting mirrors 211 and 212 is located on a side surface of the received light deflecting portion 20b on an opposite side of the side surface on which the shielding portion 214a is located.

[3-2. Low Reflecting Portion]

Figure 5:
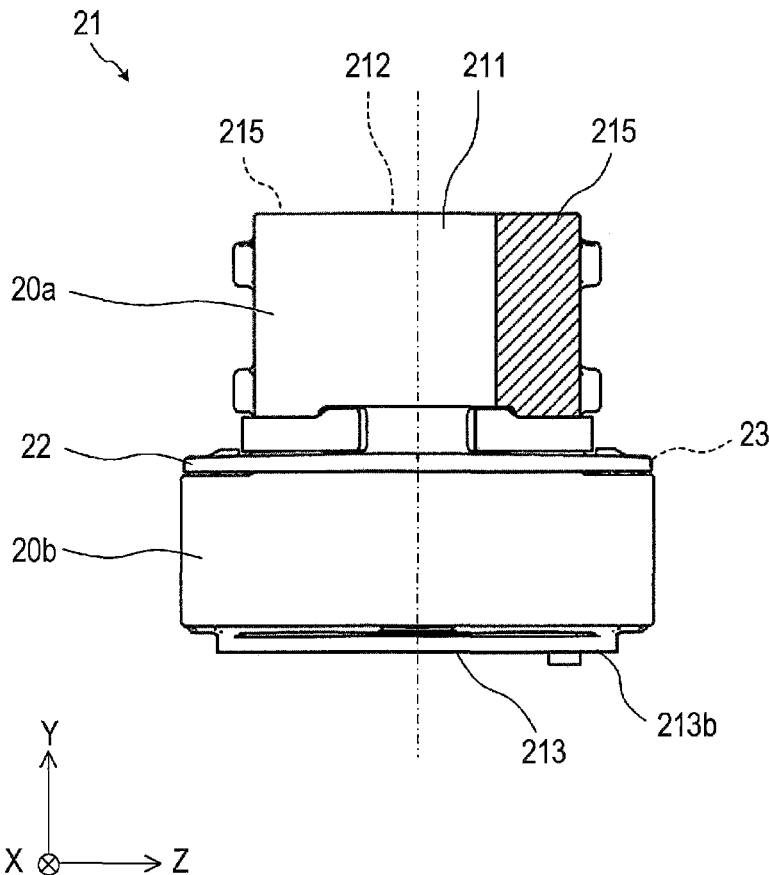
FIG. 5 is a view of the mirror module viewed from a reflecting surface.

As indicated by shaded portions in FIG. 5, low reflecting portions 215 which are portions which are less likely to reflect light are formed at part of the reflecting surfaces of the deflecting mirrors 211 and 212. The low reflecting portion 215 is constituted by, for example, black ink which is the same as the black ink of the shielding portions 214a and 214b being printed on the reflective film.

A position where the low reflecting portion 215 is formed will be described using FIG. 6 and FIG. 7. The low reflecting portion 215 is formed at an end portion of the reflecting surface at the projected light deflecting portion 20a on the optical window 200 side at each of the deflecting mirrors 211 and 212 in a state where the reflecting surface faces the projecting portion 10. In FIG. 6 and FIG. 7, the low reflecting portion 215 at each of the deflecting mirrors 211 and 212 is indicated by a shaded portion on the reflecting surface of the projected light deflecting portion 20a. In other words, the low reflecting portion 215 is located at an end portion on the same side as the side surface on which the shielding portion 214a is located at the projected light deflecting portion 20a. In a case where the shielding portions 214a and 214b and the low reflecting portion 215 are formed using the same black ink, the shielding portion 214a and the low reflecting portion 215 are continuously formed.

4. PROJECTING PORTION

As illustrated in FIG. 3, the projecting portion 10 includes a pair of light emitting modules 11 and 12. The projecting portion 10 may include a projected light turning mirror 15.

The light emitting module 11 includes a light source 111 and a light emitting lens 112, which are disposed so as to face each other. A semiconductor laser is used as the light source 111. The light emitting lens 112 is a lens which condenses light emitted from the light source 111 to have a narrower beam width. In a similar manner, the light emitting module 12 includes a light source 121 and a light emitting lens 122. The light emitting module 12 is similar to the light emitting module 11, and thus, description will be omitted.

The projected light turning mirror 15 is a mirror which changes a light traveling direction.

The light emitting module 11 is disposed so that light output from the light emitting module 11 is directly incident on the projected light deflecting portion 20a.

The light emitting module 12 is disposed so that light output from the light emitting module 12 is incident on the projected light deflecting portion 20a after a traveling direction is bent by approximately 90° at the projected light turning mirror 15.

Here, the light emitting module 11 is disposed so as to output light from left to right in the X axis direction, and the light emitting module 12 is disposed so as to output light from back to front in the Z axis direction. Further, the projected light turning mirror 15 is disposed so as not to block a path of light from the light emitting module 11 to the projected light deflecting portion 20a.

5. LIGHT RECEIVING PORTION

The light receiving portion 30 includes a light receiving element 31. The light receiving portion 30 may include a light receiving lens 32 and a received light turning mirror 33.

The light receiving element 31 has an APD array in which a plurality of APDs are arranged in line. APD is an abbreviation for avalanche photodiode.

The light receiving lens 32 is a lens which condenses light coming from the received light deflecting portion 20*b*.

The received light turning mirror 33 is a mirror which is disposed on a left side in the X axis direction of the light receiving lens 32 and which changes a light traveling direction. The light receiving element 31 is disposed on a lower part of the received light turning mirror 33.

The received light turning mirror 33 is disposed so as to bend a path of light downward by approximately 90° so that light incident from the received light deflecting portion 20*b* via the light receiving lens 32 reaches the light receiving element 31.

The light receiving lens 32 is disposed between the received light deflecting portion 20*b* and the received light turning mirror 33. The light receiving lens 32 condenses light so that a beam diameter of an optical beam incident on the light receiving element 31 becomes approximately an element width of the APD.

6. OPERATION OF OPTICAL DETECTION MODULE

Transmission light output from the light emitting module 11 is incident on the projected light deflecting portion 20*a*. Further, transmission light output from the light emitting module 12 is incident on the projected light deflecting portion 20*a* after a traveling direction is bent by approximately 90° at the projected light turning mirror 15. The transmission light incident on the projected light deflecting portion 20*a* is emitted in a direction in accordance with a rotation angle of the mirror module 21 via the optical window 200. A range of radiation of the transmission light via the mirror module 21 is a scanning range. For example, a range of ±60° expanding along the X axis direction assuming that a front direction along the Z axis is 0 degree can be set as a scanning range. Transmission light emitted within the scanning range is indicated by an optical path B in FIG. 6 and FIG. 7.

Reflected light from a subject located in a predetermined direction in accordance with a rotational position of the mirror module 21, that is, in an emitting direction of the transmission light from the projected light deflecting portion 20*a* passes through the optical window 200 and is reflected at the received light deflecting portion 20*b*. Then, the reflected light is received at the light receiving element 31 via the light receiving lens 32 and the received light turning mirror 33.

7. POSITIONS OF SHIELDING PORTION AND LOW REFLECTING PORTION WITH RESPECT TO OPTICAL PATH OF RETURN LIGHT

In a configuration which includes the optical window 200 and which performs scanning for light using the deflecting mirrors 211 and 212 which are rotationally driven, as in the lidar device 1 of the present embodiment, there is a case where part of transmission light returns to the projected light deflecting portion 20*a* as return light RL. In other words, as illustrated in FIG. 6 and FIG. 7, there is a case where when transmission light reflected at the projected light deflecting portion 20*a* passes through the optical window 200, part of the transmission light is further reflected at the optical window 200 to become return light RL and returns to the projected light deflecting portion 20*a* without being emitted outside the casing 100. Note that an original optical path B of transmission light which is reflected at the projected light deflecting portion 20*a* of the deflecting mirror 211 and emitted is indicated by a solid line, and an optical path of the return light RL is indicated by a dashed line. In FIG. 7, only return light RL which is incident on a side surface on the optical window 200 side of the projected light deflecting portion 20*a* of the deflecting mirror 211 among the generated return light RL is indicated by a dashed line. Further, transmission light which is reflected at the optical window 200 and becomes the return light RL among the transmission light is indicated by a double line.

A case where the return light RL is incident on the reflecting surface of the projected light deflecting portion 20*a* of the deflecting mirror 211 is illustrated in FIG. 6. In a case where the low reflecting portion 215 is not provided, the return light RL is reflected on the reflecting surface of the projected light deflecting portion 20*a* again and becomes stray light SL which is light emitted in a direction different from a direction in which the light should be originally emitted, as indicated by a dashed line. If the stray light SL is reflected at an object, the light returns in a reverse direction on a path which is the same as the path on which the light is emitted and is received at the light receiving portion 30. By this means, ghosting occurs which is an object detected although the object does not actually exist. While the transmission light output from the projecting portion 10 is reflected at a portion around a center of the reflecting surface of the projected light deflecting portion 20*a*, the return light RL is reflected at a portion closer to the optical window 200 than the portion at which the transmission light is reflected.

In the present embodiment, the low reflecting portion 215 is formed in a region where the return light RL is reflected on the reflecting surface of the projected light deflecting portion 20*a*, and thus, an amount of the return light RL which is reflected is reduced, so that an amount of the stray light SL is reduced. Note that the low reflecting portion 215 is formed closer to the optical window 200 than a central portion on the reflecting surface of the projected light deflecting portion 20*a* is, which is a region where the transmission light is reflected, and thus, reflection of the transmission light is less affected.

Further, a case where the return light RL is incident on a side surface on the optical window 200 side of the projected light deflecting portion 20*a* of the deflecting mirror 211 is illustrated in FIG. 7. In a case where the shielding portion 214*a* is not provided, the return light RL enters inside the deflecting mirror 211 from the side surface and passes along the inside of the deflecting mirror 211 from the projected light deflecting portion 20*a* to the received light deflecting portion 20*b* while the return light RL is repeatedly reflected as indicated by a dashed line. In a case where the shielding portion 214*b* is not provided, the return light RL which passes along the inside of the deflecting mirror 211 and reaches the side surface on the light receiving portion 30 side of the received light deflecting portion 20*b* exits the deflecting mirror 211 from the side surface and is received at the light receiving portion 30. By this means, ghost occurs.

In the present embodiment, the shielding portion 214*a* is formed on the side surface of the projected light deflecting portion 20*a* which becomes an entry when the return light RL enters inside of the deflecting mirrors 211 and 212. Further, the shielding portion 214*b* is formed on the side surface of the received light deflecting portion 20*b* which becomes an exit of the return light RL which has passed along the inside of the deflecting mirrors 211 and 212. This reduces an amount of the return light RL which passes along the inside of the deflecting mirrors 211 and 212 and is received at the light receiving portion 30.

8. EFFECTS

According to the embodiment described in detail above, the following effects can be obtained.

(8a) At the lidar device 1, each of the pair of deflecting mirrors 211 and 212 includes the shielding portion 214*a* which is a portion through which light is less likely to pass on a side surface closer to the optical window 200 in a state where the reflecting surface faces the projecting portion 10 out of both side surfaces located across the rotational axis at the projected light deflecting portion 20*a*. This can prevent the return light RL which is incident on the side surface from entering inside of the deflecting mirrors 211 and 212 from the side surface.

Further, at the lidar device 1, each of the pair of deflecting mirrors 211 and 212 includes the shielding portion 214*b* through which light is less likely to pass on a side surface farther from the optical window 200 in a state where the reflecting surface faces the light receiving portion 30 out of both side surfaces located across the rotational axis at the received light deflecting portion 20*b*. This can prevent the return light RL which enters inside of the deflecting mirrors 211 and 212 from going outside of the deflecting mirrors 211 and 212 from the side surface and being received at the light receiving portion 30.

According to such a configuration, an amount of the return light RL which passes along the inside of the deflecting mirrors 211 and 212 and is received at the light receiving portion 30 is reduced, so that occurrence of ghost due to the return light RL can be reduced.

(8b) At the lidar device 1, each of the pair of deflecting mirrors 211 and 212 includes the low reflecting portion 215 which is a portion which is less likely to reflect light at an end portion of the reflecting surface of the projected light deflecting portion 20*a* which becomes the optical window 200 side in a state where the reflecting surface faces the projecting portion 10. According to such a configuration, it is possible to prevent the return light RL from being reflected on the reflecting surface of the projected light deflecting portion 20*a*, which reduces an amount of the stray light SL generated by the reflection, so that it is possible to further reduce occurrence of ghost due to the return light RL.

Note that the transmission light output from the projecting portion 10 is reflected at a portion around the center of the reflecting surface of the projected light deflecting portion 20*a*, and the return light RL is reflected at a portion closer to the optical window 200 than the portion where the transmission light is reflected. The low reflecting portion 215 is formed at a portion closer to the optical window 200 than the central portion of the reflecting surface of the projected light deflecting portion 20*a* which is a region where the transmission light is reflected, and thus, reflection of the transmission light is less affected while reflection of the return light RL is prevented.

(8c) At the lidar device 1, the shielding portions 214*a* and 214*b* and the low reflecting portion 215 are formed by the same black ink being printed on surfaces of the deflecting mirrors 211 and 212, and the shielding portion 214*a* and the low reflecting portion 215 are continuously formed. According to such a configuration, it is possible to easily and efficiently manufacture the shielding portions 214*a* and 214*b* and the low reflecting portion 215.

Note that in the present embodiment, the transmission light corresponds to a transmission wave, the projecting portion 10 corresponds to a transmitting portion, the reflected light corresponds to a reflected wave, the light receiving portion 30 corresponds to a receiving portion, the projected light deflecting portion 20*a* corresponds to a transmission deflecting portion, the received light deflecting portion 20*b* corresponds to a reception deflecting portion, the optical window 200 corresponds to a transmissive window, and black ink corresponds to a black coat.

9. OTHER EMBODIMENTS

While the embodiment of the present disclosure has been described above, it goes without saying that the present disclosure is not limited to the above-described embodiment and can take various forms.

(9a) In the above-described embodiment, both the shielding portion 214*a* and the shielding portion 214*b* are formed at each of the deflecting mirrors 211 and 212. However, only one of the shielding portion 214*a* and the shielding portion 214*b* may be formed.

(9b) In the above-described embodiment, the shielding portion 214*a* is formed on a side surface closer to the optical window 200 at each of the deflecting mirrors 211 and 212 in a state where the reflecting surface faces the projecting portion 10 out of both side surfaces located across the rotational axis at the projected light deflecting portion 20*a*. However, a position where the shielding portion 214*a* is formed is not limited to this position. For example, the shielding portion 214*a* may be formed on both side surfaces across the rotational axis at the projected light deflecting portion 20*a* or may be formed on all side surfaces of the projected light deflecting portion 20*a*.

(9c) In the above-described embodiment, the shielding portion 214*b* is formed on a side surface farther from the optical window 200 at each of the deflecting mirror 211 and 212 in a state where the reflecting surface faces the light receiving portion 30 out of both side surfaces located across the rotational axis at the received light deflecting portion 20*b*. However, a position where the shielding portion 214*b* is formed is not limited to this position. For example, the shielding portion 214*b* may be formed on both side surfaces across the rotational is at the received light deflecting portion 20*b* or may be formed on all side surfaces of the received light deflecting portion 20*b*.

(9d) In the above-described embodiment, while the shielding portions 214*a* and 214*b* and the low reflecting portion 215 are constituted by black ink being printed, a method for constituting the shielding portions 214*a* and 214*b* and the low reflecting portion 215 is not limited to this. Substances of the shielding portions 214*a* and 214*b* and the low reflecting portion 215 may be different from each other if the shielding portions 214*a* and 214*b* are constituted with a substance through which light is less likely to pass, and the low reflecting portion 215 is constituted with a substance which is less likely to reflect light.

(9e) In the above-described embodiment, while the lidar device 1 has been described as an example of a distance measurement device, a type of the distance measurement device is not limited to this. For example, the distance measurement device may be a millimeter wave radar device, or the like.

(9f) Functions of one component in the above-described embodiment may be dispersed as a plurality of components or functions of a plurality of components may be integrated into one component. Further, part of the configuration of the above-described embodiment may be omitted. Still further, at least part of the configuration of the above-described embodiment may be added to or replaced with configurations of other embodiments.

What is claimed is:

1. A distance measurement device comprising:

a transmitting portion configured to output a transmission wave;

a receiving portion configured to detect a reflected wave from an object irradiated with the transmission wave;

a mirror module including a pair of deflecting mirrors which deflect the transmission wave and the reflected wave in a direction in accordance with a rotation angle of a reflecting surface and a mirror support which supports the pair of deflecting mirrors by being disposed between the pair of deflecting mirrors and is configured to rotate in accordance with drive of a motor;

dividing plates which are plate-like members provided to divide the pair of deflecting mirrors into two portions of a transmission deflecting portion which is a portion located on the transmitting portion side and a reception deflection portion which is a portion located on the receiving portion side, and which is configured to rotate integrally with the mirror module;

a casing configured to store the transmitting portion, the receiving portion, the mirror module and the dividing plates; and a transmissive window which is provided at an opening of the casing and which allows the transmission wave and the reflected wave to pass through, wherein each of the pair of deflecting mirrors includes:

shielding portions, through which passage of the transmission waves is suppressed are disposed on a side surface closer to the transmissive window in a state where the reflecting surface faces the transmitting portion out of both side surfaces located across a rotational axis at the transmission deflecting portion, and the shielding portions, through which passage of the transmission waves is suppressed, are not disposed on a side surface farther from the transmissive window in a state where the reflecting surface faces the transmitting portion out of both side surfaces located across the rotational axis at the transmission deflecting portion, and/or the shielding portions, through which passage of the transmission waves is suppressed, are disposed on the side surface farther from the transmissive window in a state where the reflecting surface faces the transmitting portion out of both side surfaces located across the rotational axis at the transmission deflecting portion, and the shielding portions, through which passage of the transmission waves is suppressed, are not disposed on the side surface closer to the transmissive window in a state where the reflecting surface faces the transmitting portion out of both side surfaces located across the rotational axis at the transmission deflecting portion.

2. The distance measurement device according to claim 1, wherein each of the pair of deflecting mirrors further includes a low reflecting portion which suppresses the reflection of the transmission waves at an end portion on the reflecting surface of the transmission deflecting portion which is on the transmissive window side in a state where the reflecting surface faces the transmitting portion, and the low reflecting portion, which suppresses the reflection of the transmission waves, is not disposed at an end portion on the reflecting surface of the transmission deflecting portion, which is on the opposite side to the transmissive window side in a state where the reflecting surface faces the transmitting portion.

3. The distance measurement device according to claim 2, wherein the shielding portions and the low reflecting portion are black coatings.

4. A distance measurement device comprising:

a transmitting portion configured to output a transmission wave;

a receiving portion configured to detect a reflected wave from an object irradiated with the transmission wave;

a mirror module including a pair of deflecting mirrors which deflect the transmission wave and the reflected wave in a direction in accordance with a rotation angle of a reflecting surface and a mirror support which supports the pair of deflecting mirrors by being disposed between the pair of deflecting mirrors and is configured to rotate in accordance with drive of a motor;

dividing plates which are plate-like members provided to divide the pair of deflecting mirrors into two portions of a transmission deflecting portion which is a portion located on the transmitting portion side and a reception deflection portion which is a portion located on the receiving portion side, and which is configured to rotate integrally with the mirror module;

a casing configured to store the transmitting portion, the receiving portion, the mirror module and the dividing plates; and a transmissive window which is provided at an opening of the casing and which allows the transmission wave and the reflected wave to pass through, wherein the pair of deflection mirrors are configured such that a reflective film that reflects the transmission wave and the reflected wave to the reflecting surface is formed on a member which allows the transmission wave and the reflected wave to pass through, each of the pair of deflecting mirrors includes shielding portions, through which passage of the transmission waves is suppressed, are disposed on at least one of a side surface closer to the transmissive window in a state where the reflecting surface faces the transmitting portion out of both side surfaces located across a rotational axis at the transmission deflecting portion, or a side surface farther from the transmissive window in a state where the reflecting surface faces the receiving portion out of both side surfaces located across a rotational axis at the reception deflecting portion.

* * * * *